(12) United States Patent
Zimmerman (10) Patent No.: US 9,949,462 B2
(45) Date of Patent: Apr. 24, 2018

(54) LOADER MOUNTED BLOWER FOR CLEANING CHICKEN HOUSES

(71) Applicant: H. Lamar Zimmerman, Manheim, PA (US)

(72) Inventor: H. Lamar Zimmerman, Manheim, PA (US)

(*) Notice: Subject to any disclaimer, the term of this patent is extended or adjusted under 35 U.S.C. 154(b) by 975 days.

(21) Appl. No.: 14/313,333

(22) Filed: Jun. 24, 2014

(65) Prior Publication Data

US 2015/0013104 A1  Jan. 15, 2015

Related U.S. Application Data

(60) Provisional application No. 61/842,286, filed on Jul. 2, 2013.

(51) Int. Cl.
| | |
|---|---|
| *A01K 1/01* | (2006.01) |
| *A01K 31/04* | (2006.01) |
| *A01K 31/18* | (2006.01) |
| *A01K 31/20* | (2006.01) |

(52) U.S. Cl.
CPC ............... *A01K 31/04* (2013.01); *A01K 1/01* (2013.01); *A01K 31/18* (2013.01); *A01K 31/20* (2013.01)

(58) Field of Classification Search
CPC ........ A01K 1/01; A01K 31/04; A01K 1/0047; A01K 31/18; A07K 13/001
USPC ........ 15/405, 340.1; 119/448, 493, 500, 458
See application file for complete search history.

(56) References Cited

U.S. PATENT DOCUMENTS

| | | | | |
|---|---|---|---|---|
| 5,401,940 A | * | 3/1995 | Smith ................... | A21B 1/245 219/679 |
| 5,740,763 A | * | 4/1998 | Hollingsworth ....... | A01K 31/04 119/442 |
| 5,806,685 A | * | 9/1998 | Lastinger ............... | A01K 31/04 209/235 |
| 5,865,143 A | * | 2/1999 | Moore, Jr. ........... | A01K 1/0152 119/442 |
| 5,901,911 A | * | 5/1999 | Davis ................... | A01K 1/0146 241/101.72 |
| 8,291,623 B2 | * | 10/2012 | Shirland ................ | E01H 5/045 37/231 |
| 2008/0173252 A1 | * | 7/2008 | Boyd .................... | A01K 1/0117 119/479 |
| 2012/0103712 A1 | * | 5/2012 | Stanek ................... | B60K 11/04 180/68.1 |

(Continued)

*Primary Examiner* — Michael Jennings
(74) *Attorney, Agent, or Firm* — Miller Law Group, PLLC (57) ABSTRACT

A blower apparatus is supported on a frame detachably mounted on the implement mounting plate for a skid steer loader. The blower is powered by a hydraulic motor operatively connected to the auxiliary hydraulic system of the skid steer loader. The blower is mounted on the frame in a manner that orients the discharge spout upwardly to be directed at elevated structure within the chicken house. Re-orientation of the air stream from the blower can be affected by manipulating the tilt position of the implement mounting plate and by raising the boom arms of the skid steer loader to elevate the blower apparatus. By properly positioning and orienting the discharged air stream from the blower apparatus, the dirt and debris in elevated structure of the chicken house can be dislodged and removed from the chicken house to improve the health and environment for a subsequent flock of birds installed therein.

17 Claims, 7 Drawing Sheets

(56) References Cited

U.S. PATENT DOCUMENTS

| | | | |
|---|---|---|---|
| 2013/0001984 A1* | 1/2013 | Spencer | B60H 1/00207 296/190.09 |
| 2013/0158815 A1* | 6/2013 | Nicholson | A01D 69/00 701/50 |
| 2013/0269735 A1* | 10/2013 | Roetzel | E21B 21/062 134/40 |
| 2014/0130384 A1* | 5/2014 | Favorito | E01H 5/09 37/242 |

* cited by examiner

LOADER MOUNTED BLOWER FOR CLEANING CHICKEN HOUSES

CROSS-REFERENCE TO RELATED APPLICATIONS

This application claims domestic priority on U.S. Provisional Patent Application Ser. No. 61/842,286, filed on Jul. 2, 2013, the content of which is incorporated herein by reference.

FIELD OF THE INVENTION

This invention relates generally to devices to facilitate the cleaning of chicken houses after chickens have been removed and before a new batch of chickens are delivered, and more particularly, to a hydraulically driven blower that can be mounted on a skid steer loader or other similar carrier to remove debris from the emptied chicken house structure.

BACKGROUND OF THE INVENTION

Chicken houses are used to raise chickens from a young age to an adult bird when the adult chickens are crated and delivered to a processing plant. Modern chicken houses can be provided with automated feeding devices that deliver food for the growing chickens and with automated watering devices that provide fresh supplies of water as the water is consumed by the chickens. Once the chickens have been grown to an adult size and removed from the chicken house, the chicken house must be cleaned to reduce the spread of any diseases from one flock of chickens to the next flock of chickens to be raised in the facility.

Proper cleaning the emptied chicken house requires the removal of the feathers, litter and dirt from the interior of the chicken house. To that end, manually operated blowers are typically utilized by people carrying the blowers through the chicken house structure to relocate the unwanted material into a pile at one end of the structure where a skid steer loader can be utilized to remove the collected unwanted material from the facility. Because of the quantity of feathers, dirt and dried litter found throughout the chicken house structure, carrying manually operated blowers to relocate the unwanted material is a dusty job requiring the use of respirators and eyewear.

Blowers are particularly valuable for cleaning dirt and debris off of the elevated heating systems, such as tube heaters, brooders and space heaters, typically utilized within the chicken houses. In addition, blowers are very useful in the cleaning of the vertically oriented exhaust fans mounted in the chicken house walls, including the fan blades and the shutters controlling the flow of air through the exhaust fans. Cleaning the shutters is particularly sensitive matter for operating chicken houses in the warm summer months as the accumulation of dust and feathers restrict air flow through the shutters, making the fans less effective in operation. Cleaning the shutters is typically accomplished from the exterior of the chicken house.

Skid steer loaders are typically used in the cleaning of a chicken house because of the low profile and the maneuverability of the vehicle is particularly suited to the long, one story chicken house structure. Skid steer loaders have hydraulically driven wheels that steer the loader through differential steering by varying the flow of hydraulic fluid through the motors powering the rotation of the wheels on the respective sides of the loader. Skid steer loaders are provided with a boom structure that terminates at a mounting plate located forwardly of the operator's cab. Different operative devices can be detachably mounted on the boom mounting plate, including buckets and hydraulically driven rotary brooms that can be utilized in the cleaning of the chicken house. Alternatively, small compact tractors can be utilized instead of skid steer loaders, as compact tractors have booms that can carry attached implements as well.

It would be desirable to provide a device that can replace the manually operated blowers to facilitate and speed the process of cleaning chicken houses for the delivery of a new flock of young chickens.

SUMMARY OF THE INVENTION

It is an object of this invention to provide a blower apparatus mounted on a skid steer loader to clean debris from a vacated chicken house.

It is an advantage of this invention that the skid steer mounted blower mechanism can be manipulated to direct a stream of air into elevated structure in a vacated chicken house.

It is a feature of this invention that the blower is driven by a hydraulic motor operatively connected to the auxiliary hydraulic system of the skid steer loader on which the blower apparatus is mounted.

It is another feature of this invention that the discharge tube of the blower apparatus is angled upwardly to direct a stream of air toward elevated structure of a vacated chicken house.

It is another object of this invention to provide a skid steer mounted blower apparatus for cleaning vacated chicken houses that is positionally adjustable through manipulation of the skid steer loader's boom and implement attachment plate.

It is still another feature of this invention that the orientation of the stream of air from the blower apparatus can be varied by tilting the implement mounting plate on the skid steer loader.

It is another advantage of this invention that the orientation of the air stream from the blower apparatus can be lowered by tilting the implement adjustment plate forwardly.

It is still another feature of this invention that the blower apparatus includes a mounting frame supporting the hydraulically powered blower so that the blower apparatus can be detachably mounted on the implement mounting plate of the skid steer loader.

It is still another advantage of this invention that the dirt and debris from elevated structure within a vacated chicken house can be dislodged and deposited on the floor where other implements can be utilized to remove the dirt and debris from the vacated chicken house before installing a new flock of chickens.

It is yet another advantage of this invention that the blower apparatus can improve the cleaning operation for a vacated chicken house between flocks of chickens to improve the health and environment for the subsequently installed flock of chickens.

It is still another object of this invention to provide a blower apparatus and method of cleaning a vacated chicken house that is easy to manufacture and assembly, and easy and effective in operation.

These and other objects, features and advantages are accomplished according to the instant invention by providing a blower apparatus supported on a frame that is detachably mounted on the implement mounting plate for a skid steer loader. The blower is powered by a hydraulic motor operatively connected to the auxiliary hydraulic system of the skid steer loader. The blower is mounted on the frame in a manner that orients the discharge spout upwardly to be directed at elevated structure within the chicken house. Re-orientation of the air stream from the blower can be affected by manipulating the tilt position of the implement mounting plate and/or the elevation of the blower apparatus affected by raising the boom arms of the skid steer loader. By properly positioning and orienting the discharged air stream from the blower apparatus, the dirt and debris in elevated structure of the chicken house can be dislodged and removed from the chicken house to improve the health and environment for a subsequent flock of birds installed therein.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
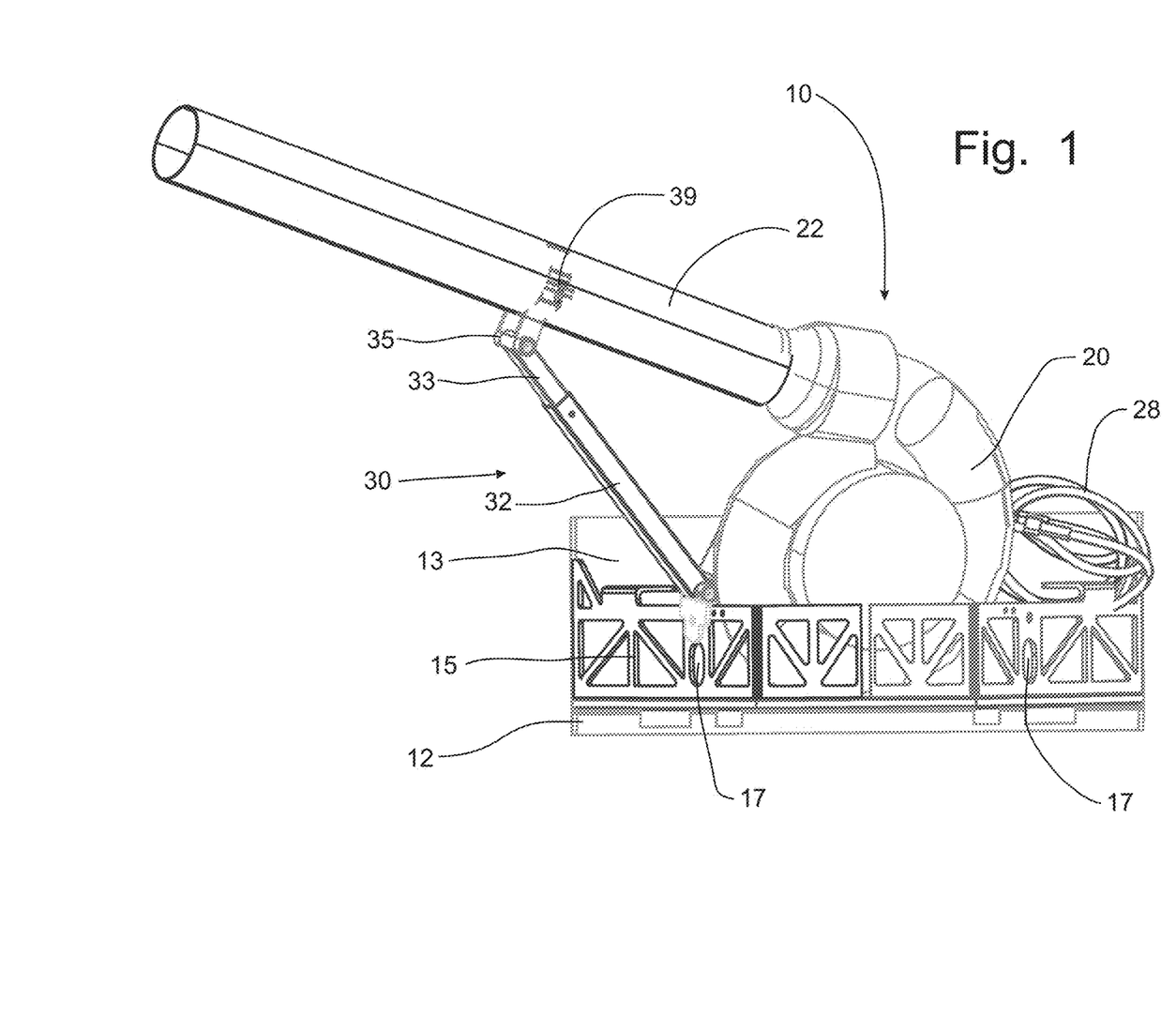
FIG. 1 is a front elevational view of the loader mounted blower apparatus incorporating the principles of the instant invention.
Figure 2:
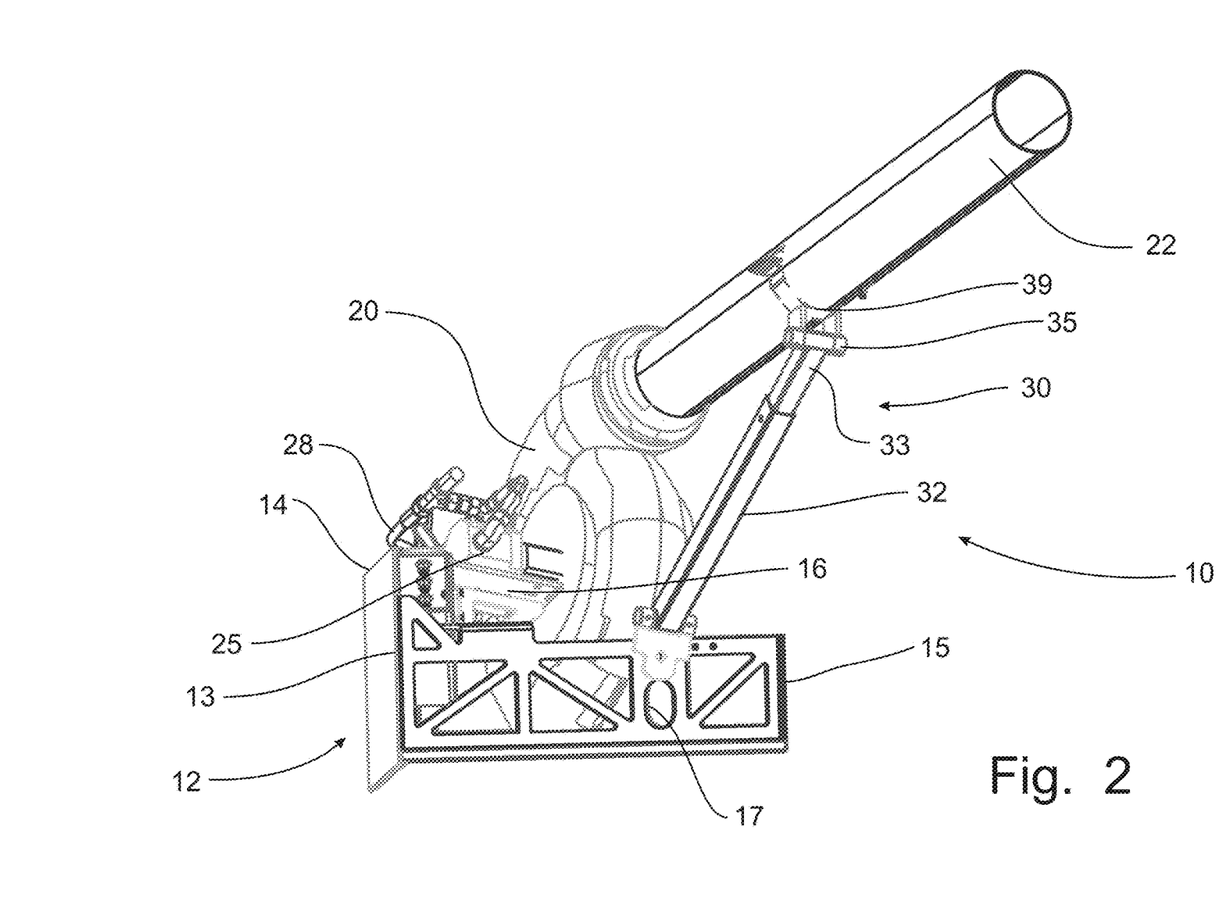
FIG. 2 is a right side elevational view of the loader mounted blower apparatus shown in FIG. 1.
Figure 3:
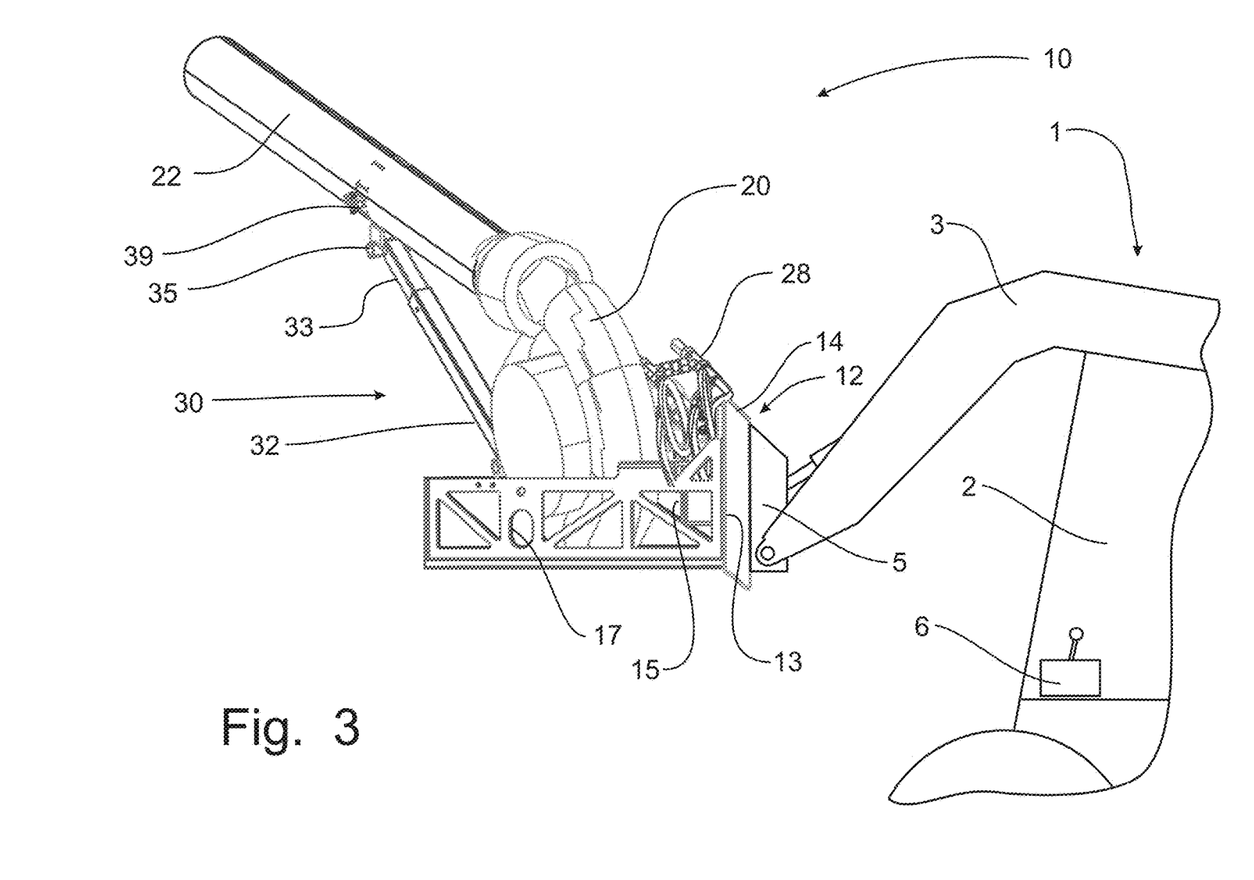
FIG. 3 is a left side elevational view of the loader mounted blower apparatus shown in FIG. 1 attached to a representative skid steer loader.
Figure 4:
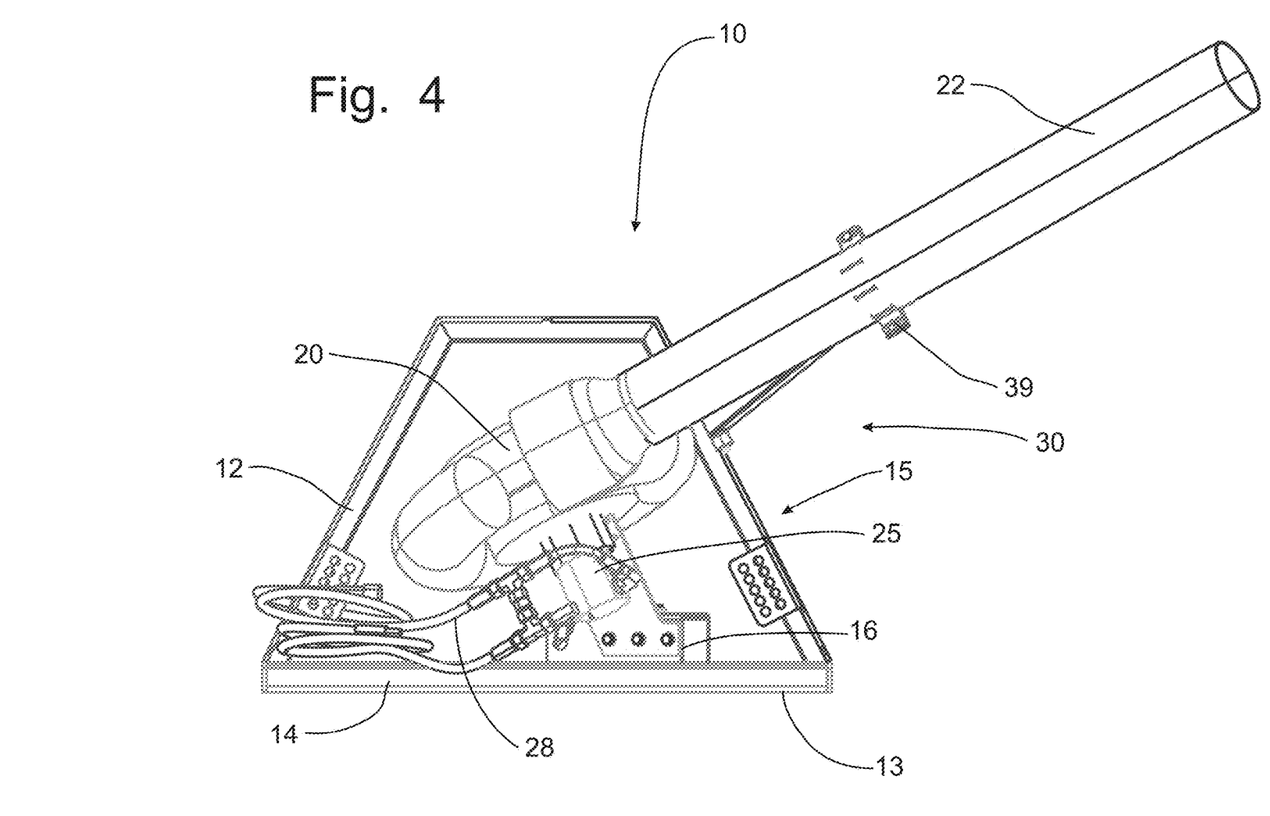
FIG. 4 is a top plan view of the loader mounted blower apparatus shown in FIG. 1.
Figure 5:
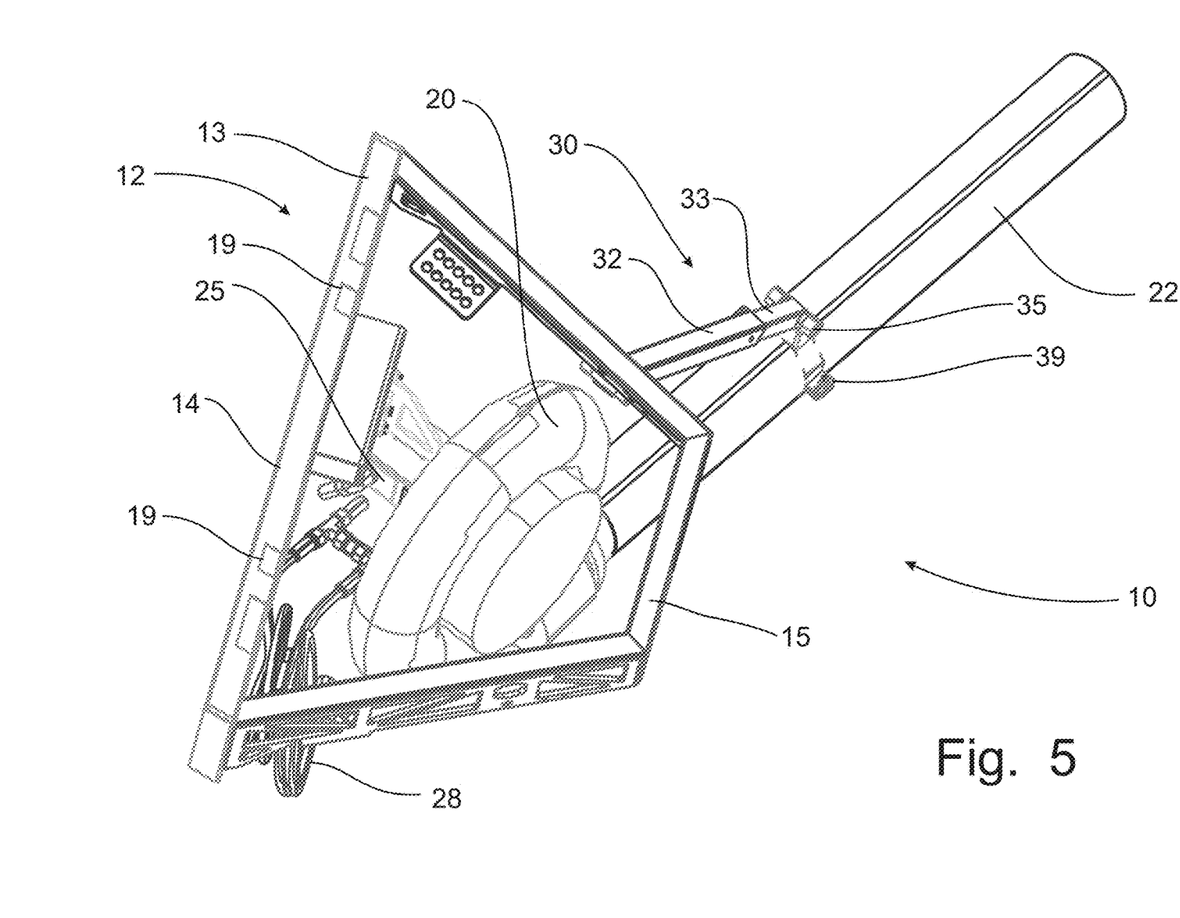
FIG. 5 is a bottom plan view of the loader mounted blower apparatus shown in FIG. 1.
Figure 6:
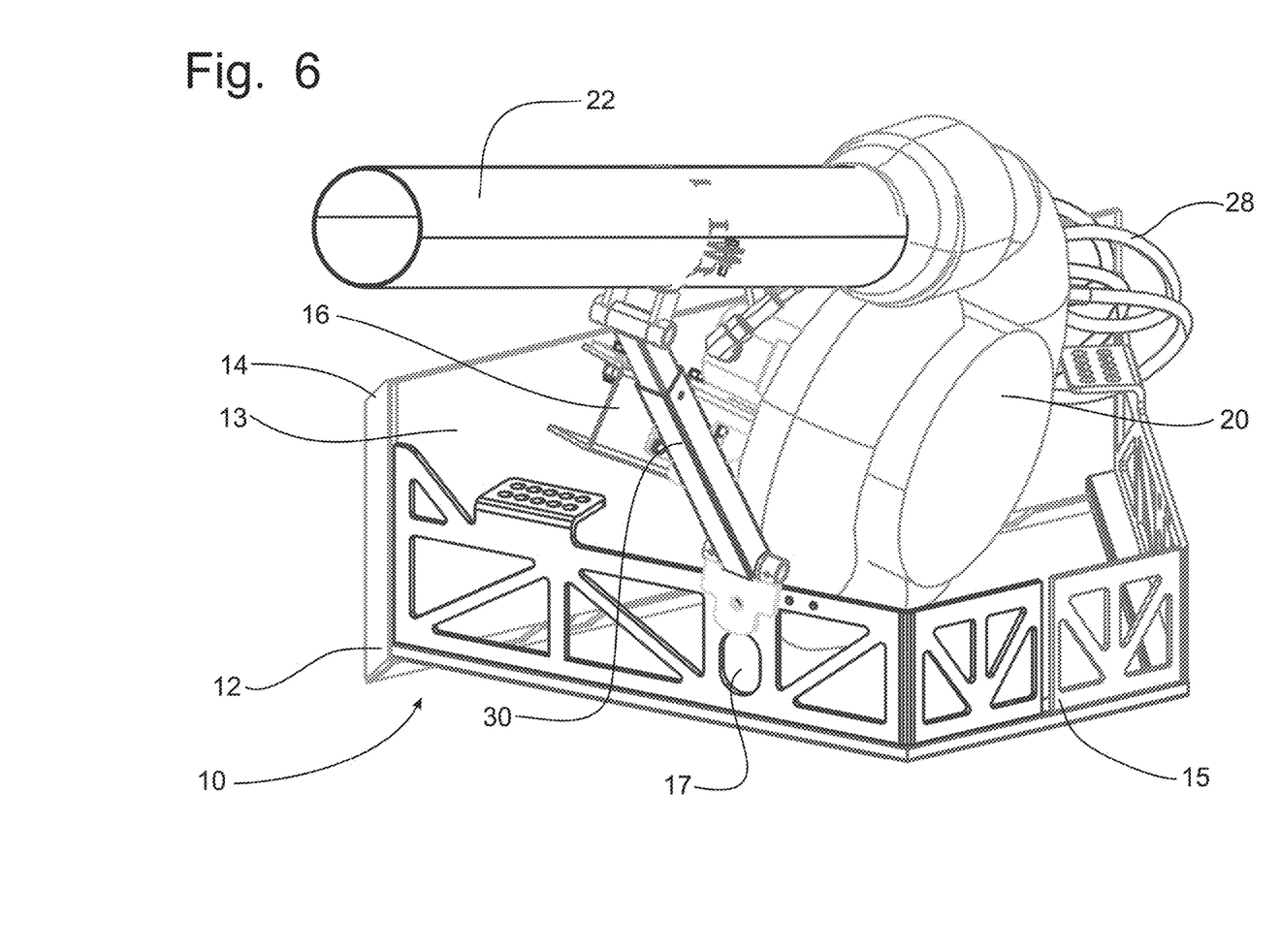
FIG. 6 is a right side perspective view of the loader mounted blower apparatus shown in FIG. 1.
Figure 7:
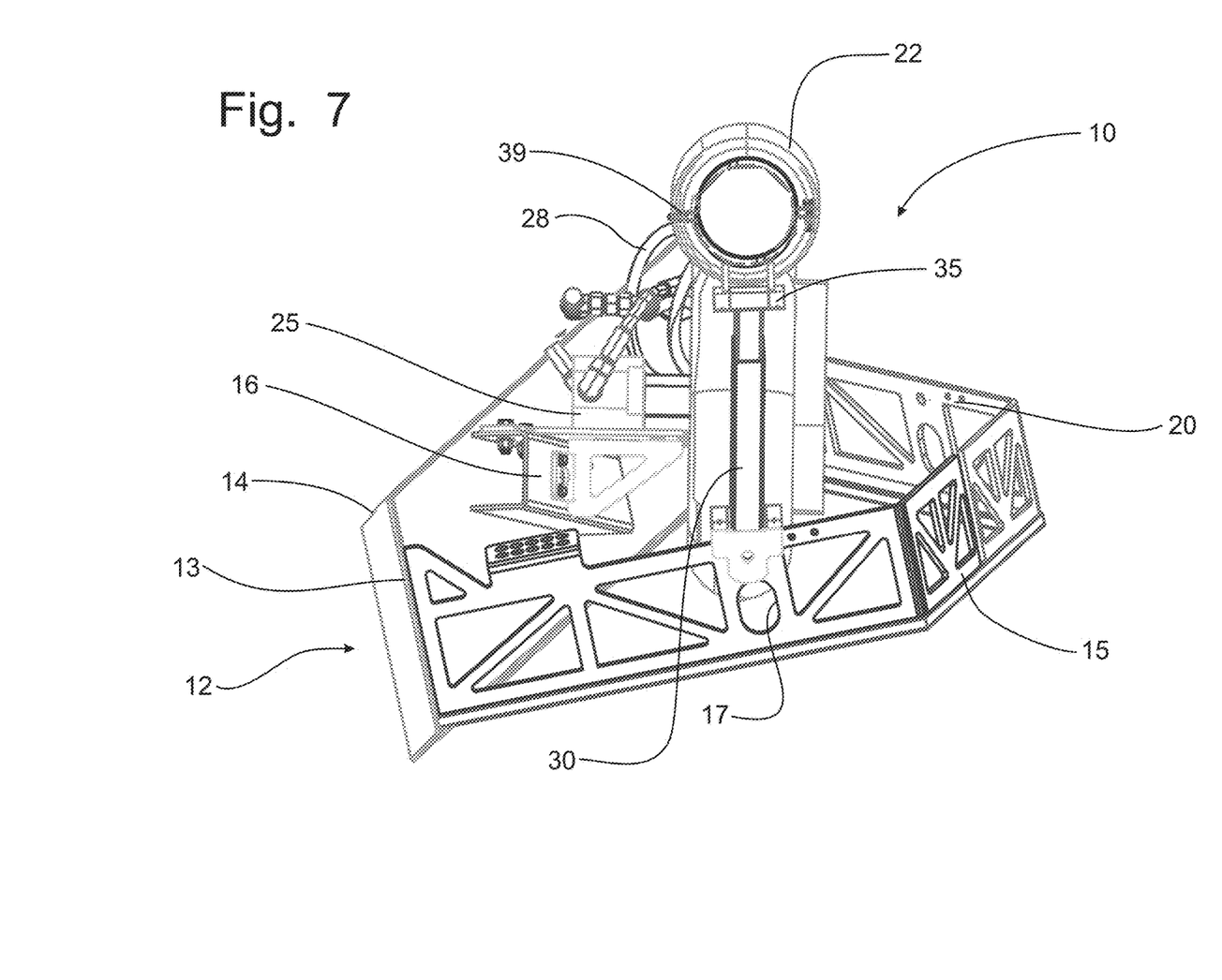
FIG. 7 is an upper right side perspective view of the loader mounted blower apparatus shown in FIG. 1, looking into the discharge tube of the blower.

Referring now to the drawings, the structural components of the skid steer mounted blower apparatus 10 can best be seen. Any left and right references are used as a matter of convenience and are determined by standing behind the mounting frame 12, which is mounted on the implement mounting plate 5 of the skid steer loader 1, which would be the orientation of an operator seated in the skid steer loader 1 to which the blower apparatus 10 would be mounted, and facing the forward direction, the normal direction of travel. The blower apparatus 10 is mounted on the implement mounting plate 5 at the forward end of the loader boom apparatus 3 which is located in front of the operator's cab 2 of the skid steer loader 1. The operation of the boom apparatus 3 and the implement mounting plate 5 are controlled through the loader hydraulic system having a control mechanism 6 to affect operation. One skilled in the art will understand that the principles of the instant invention are not limited to the mounting of the blower apparatus 10 on a skid steer loader as the blower apparatus 10 can be mounted on other prime movers (not shown), such as a compact tractor or perhaps an all terrain vehicle (ATV). Since the preferred embodiment is a blower apparatus 10 that is mounted on a skid steer loader 1, this is the embodiment shown in the drawings.

The blower apparatus 10 includes a mounting frame 12 that is adapted for mounting on the implement mounting plate 5 on the skid steer loader 1. Accordingly, the mounting frame 12 has a generally vertical rear plate 13 that has a retention bracket 14 along the upper horizontal edge to capture a skid steer loader implement mounting plate 5, as is conventional in the art of skid steer loader attachments. As is conventional in the mounting of detachable devices on skid steer loader mounting plates 5, the rear plate 13 would also have preferably have mounting slots 19 for engagement by the overcenter mounting clamps provided on skid steer loader mounting plates 5. Thus, the mounting frame 12 is configured in a conventional manner for mounting on a skid steer loader 1, or on any other prime mover that has a similar implement mounting structure.

Extending forwardly of the rear plate 13 in a cantilevered manner is the support frame 15 on which the blower 20 is mounted for operation, as will be described in greater detail below. The mounting frame 12 includes an angled mount 16 that is preferably connected to the rear plate 13 and projecting forwardly thereof for connection to the blower 20 to support and position the blower 20 in an orientation that is angled forwardly at an acute angle to being parallel to rear plate 13. In this orientation, the discharge spout 22 of the blower 20 is oriented to the side and forwardly with respect to the skid steer loader, which assists in the sight lines from the operator's cab of the skid steer loader as the blower apparatus 10 is being operated. The drawings depict the blower 20 in the preferred embodiment as being oriented to blow a stream of air upwardly and to the right of the skid steer loader; however, one skilled in the art will recognize that the angled mount 16 can be flipped over to mount the blower 20 so that the blower discharge spout 22 is directed forwardly and to the left of the skid steer loader.

An adjustable support brace 30 is connected to the side of the support frame 15 and extends upwardly therefrom to engage the blower discharge spout 22 to help support the blower 20 on the mounting frame 12. The use of the support brace 30 coupled with the angled mount 16 secures the blower 20 in a stable position on the mounting frame 12. The support brace 30 is preferably formed with two telescopic members 32, 33 that are fixed by a click pin to allow the support brace to be connected to the support frame 15 at a selected position defined by mounting holes 17 formed therein. Furthermore, the adjustable length of the telescopic support brace 30 allows the blower 20 to be mounted in a selected upward angle for the blower discharge spout 22. Alternatively, the support brace 30 can be of a fixed length to secure the blower discharge spout 22 at a fixed, non-adjustable angle.

A connection head 35 at the distal end of the telescopic support brace 30 provides further flexibility in the support of the blower discharge spout 22. The connection head 35 can be formed with an arcuate slot (not shown) to permit the connection head 35 to be connected to the clamp 39 that encircles the discharge spout 22 irrespective of the orientation of the connection head 35 to the clamp 39. The clamp 39 is preferably bifurcated and secured on the connection head 35 so that the clamp 39 can be properly oriented and clamped onto the blower discharge spout 22.

A hydraulic motor 25 is operatively connected to the blower 20 to provide a source of rotational power for the internal blower fan (not shown). The hydraulic motor 25 is connected to the on-board hydraulic system carried by the skid steer loader by hydraulic lines 28 to provide a flow of hydraulic fluid under pressure to the hydraulic motor 25. The operation of the hydraulic motor 25 is reversible, which permits the reverse mounting of the blower 20 on the mounting frame 12, as compared to the orientation shown in the drawings, and the rate of flow of hydraulic fluid to the hydraulic motor 25 is controlled within the enclosed skid steer loader operator cab. Accordingly, the on/off function, as well as the rate of air discharge, of the blower 20 is controlled by the operator from within the enclosed skid steer loader operator cab.

Typically, the blower 20 is mounted in an orientation for either a left discharge of air or a right discharge of air, as is depicted in the drawings. The orientation of the blower 20 is not changed once selected and secured to the mounting frame 12. The orientation of the blower discharge spout 22 can be selected and the support brace 30 mounted on the support frame 15 and extended to engage the discharge spout 22 with the clamp 39. Once properly assembled, the blower apparatus 10 is ready to be mounted on the implement mounting plate of the skid steer loader. The operator of the skid steer loader simply positions the mounting plate under the retention bracket 14 and raises the boom slightly to elevate the rear plate 13 above the ground. The weight of the support frame 15 and the mounted blower 20 will rotate the rear plate 13 onto the skid steer loader mounting plate where the overcenter clamps (not shown) can secure the rear plate 13 onto the implement mounting plate. The operator then needs to connect the hydraulic lines 28 from the hydraulic motor 25 to the skid steer loader hydraulic system, through connection ports carried on the skid steer loader, and the blower apparatus 10 is ready to be operated. The direction of operation of the hydraulic motor 25 depends on the selected orientation of the blower 20 mounted on the mounting frame 12.

An enclosed operator cab on the skid steer loader protects the operator from the blowing dirt and debris relocated by the operation of the blower apparatus 10 to enable the operator to drive the skid steer loader along the length of the chicken house and direct a stream of air from the blower 20 through the discharge spout 22 to the structure of the chicken house. The hard to reach material at the top of the chicken house structure, or on elevated heating systems, etc., can easily be reached through raising and directing the blower discharge spout 22 through operation of the skid steer loader boom controls. Raising the boom can simply raise the blower apparatus 10 above the floor of the chicken house to reach the upper structure, while the forward tipping of the mounting plate with the rear plate 13 attached thereto will change the orientation of the blower discharge spout 22 from an upwardly directed direction to a downwardly directed direction.

Thus, the manipulation of the operative controls of the skid steer loader boom will direct a stream of air from the blower discharge spout 22 anywhere along the vertical and horizontal structure of the chicken house to dislodge dirt and debris therefrom in a manner that cannot be accomplished through manually operated blowers. With the blower 20 mounted on the mounting frame 12 as shown in the drawings with the stream of air discharged to the right of the skid steer loader, the operator can travel the length of the chicken house moving the orientation of the blower discharge spout 22 up and down as the length of the chicken house is traversed to dislodge the accumulated dirt and debris from the chicken house structure and then return back along the length of the chicken house in the same manner to dislodge the dirt and debris from the opposite side of the chicken house. The collected unwanted material can then be swept up and removed from the structure by other implements mounted on the skid steer loader mounting plate.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A combination of a loader and a blower apparatus detachably mounted on said loader having a hydraulic system, said loader including hydraulic controls to selectively manipulate said hydraulic system, and a boom apparatus terminating in a mounting plate pivotally mounted for fore-and-aft pivotal movement, said combination comprising:
   a blower frame including a rear plate adapted for connection with said mounting plate and a blower support frame extending forwardly from said rear plate;
   a blower mounted on said blower frame and being operatively powered by a hydraulic motor connected to said hydraulic system of said loader and having a blower discharge spout directing a flow of air outwardly therefrom; and
   a blower support brace interconnecting said blower support frame and said blower discharge spout to support said blower discharge spout and stabilize said blower apparatus on said blower frame, said blower discharge spout being selectively positionable through manipulation of said hydraulic controls.

2. The combination of claim 1 wherein said blower is connected to said rear plate to orient said blower such that said blower discharge spout directs a flow of air forwardly and laterally of said loader.

3. The combination of claim 2 wherein said hydraulic motor is operatively coupled to said hydraulic system to receive a flow of hydraulic fluid under pressure therefrom.

4. The combination of claim 3 wherein said blower is mounted on said blower frame such that the selective pivotal movement of said mounting plate through manipulation of said hydraulic controls will vary the direction of the flow of air from said blower discharge spout from an upwardly direction from said blower to a downwardly direction from said blower.

5. The combination of claim 4 wherein said hydraulic controls can be operated to position said blower in a selective manner.

6. The combination of claim 1 wherein said blower support brace comprises:
   a pair of telescopic members including a base member and an extension member, said base member being connected to said blower support frame and said extension member being connected to said blower discharge spout.

7. The combination of claim 6 wherein said blower support brace further comprises:
   a connection head mounted on a distal end of said extension member; and
   a clamp connected to said connection head, said clamp being operable to encircle said blower discharge spout to secure said blower discharge spout to said connection head.

8. A blower apparatus adapted to be detachably mounted on a loader comprising:
   a frame including a rear plate having a retention bracket engagable with said loader and a support frame extending forwardly from said rear plate;

a mount supported from said rear plate and projecting forwardly therefrom;
a blower having a discharge spout and being connected to said mount so as to be positionable at an acute angle to said rear plate so that said discharge spout is oriented to blow a stream of air forwardly and to a side of said rear plate,
a hydraulic motor operatively connected to said blower to power the operation thereof; and
a support brace connected to said discharge spout to support said discharge spout and stabilize said blower on said frame, said discharge spout being selectively positionable through manipulation of the orientation of said rear plate.

9. The blower apparatus of claim 8 wherein said mount is detachable from said rear plate and re-positionable to mount said blower to blow said stream of air from said discharge spout forwardly and to an opposite side of said rear plate.

10. The blower apparatus of claim 8 wherein said blower is mounted on said frame such that movement of said rear plate to change the orientation of said rear plate will vary the direction of the flow of air from said discharge spout between an upwardly direction from said blower to a downwardly direction from said blower.

11. The blower apparatus of claim 8 wherein said support brace comprises:
a pair of telescopic members including a base member and an extension member, said base member being connected to said support frame and said extension member being connected to said discharge spout so that said support brace is variable in length.

12. The blower apparatus of claim 11 wherein said support brace further comprises:
a connection head mounted on a distal end of said extension member; and
a clamp connected to said connection head, said clamp being operable to encircle said discharge spout to secure said discharge spout to said connection head.

13. A loader and a blower apparatus detachably mounted thereon wherein said loader includes a hydraulic system with hydraulic controls to selectively manipulate said hydraulic system, said loader further including a boom apparatus terminating in a mounting plate, comprising:
a blower frame including a rear plate selectively mountable on said boom apparatus of said loader, said blower frame including a blower support frame extending forwardly from said rear plate;
a blower mounted on said blower frame and being operatively powered by a hydraulic motor operably connected to said hydraulic system of said loader and having a blower discharge spout directing a flow of air outwardly therefrom, said blower discharge spout being selectively positionable through manipulation of said hydraulic controls; and
a blower support brace connected to said blower discharge spout to support and to stabilize said blower discharge spout relative to said blower frame.

14. The loader and blower apparatus of claim 13 wherein said blower is mounted on said blower frame such that the selective pivotal movement of said mounting plate through manipulation of said hydraulic controls will vary the direction of the flow of air from said blower discharge spout from an upwardly direction from said blower apparatus to a downwardly direction from said blower.

15. The loader and blower apparatus of claim 13 wherein said hydraulic controls can be operated to position said blower in a selective manner.

16. The loader and blower apparatus of claim 13 wherein said mount is selectively movable relative to said rear plate to orient said blower to blow said stream of air from said discharge spout in a selected direction.

17. The blower apparatus of claim 16 wherein selective pivotal movement of said mounting plate through manipulation of said hydraulic controls will vary vertically the direction of the flow of air from said discharge spout between an upwardly oriented direction from said blower to a downwardly oriented direction from said blower.

\* \* \* \* \*